US012597616B2

(12) United States Patent
Ballantine et al.

(10) Patent No.: US 12,597,616 B2
(45) Date of Patent: Apr. 7, 2026

(54) SYSTEM AND METHOD FOR CONTROLLING HYDROGEN STACK CURRENT AND LOAD

(71) Applicant: Ohmium International, Inc., Newark, CA (US)

(72) Inventors: Arne Ballantine, Incline Village, NV (US); Frederick Paul Freeland, Jr., Port Orchard, WA (US); Rasool Aghatehrani, Redwood City, CA (US); Chockkalingam Karuppaiah, Fremont, CA (US)

(73) Assignee: Ohmium International, Inc., Newark, CA (US)

( * ) Notice: Subject to any disclaimer, the term of this patent is extended or adjusted under 35 U.S.C. 154(b) by 539 days.

(21) Appl. No.: 18/099,151

(22) Filed: Jan. 19, 2023

(65) Prior Publication Data

US 2023/0231162 A1     Jul. 20, 2023

Related U.S. Application Data

(60) Provisional application No. 63/300,911, filed on Jan. 19, 2022.

(51) Int. Cl.
H01M 8/04089     (2016.01)
H01M 8/04746     (2016.01)
H01M 8/04858     (2016.01)

(52) U.S. Cl.
CPC ... H01M 8/04089 (2013.01); H01M 8/04761 (2013.01); H01M 8/0491 (2013.01); H01M 8/0494 (2013.01)

(58) Field of Classification Search
CPC ......... H01M 8/04089; H01M 8/04761; H01M 8/0491; H01M 8/0494; C25B 15/05; C25B 15/023; C25B 1/04; C25B 1/042
See application file for complete search history.

(56) References Cited

U.S. PATENT DOCUMENTS

| 6,351,106 | B1 | 2/2002 | Kramer et al. |
| 8,669,499 | B2 | 3/2014 | Conrad |

(Continued)

FOREIGN PATENT DOCUMENTS

| CN | 104426351 A | 3/2015 |
| CN | 104956581 A | 9/2015 |

(Continued)

OTHER PUBLICATIONS

PCT Application No. PCT/US23/11162, International Preliminary Report on Patentability dated Aug. 2, 2024.

(Continued)

*Primary Examiner* — Olatunji A Godo

(74) *Attorney, Agent, or Firm* — Polsinelli LLP

(57) ABSTRACT

The present disclosure relates to systems and methods for controlling hydrogen stack power and load. The systems include at least one hydrogen stack, a pressure sensor, and a controller, wherein the controller is operable to increase or decrease the power to the at least one hydrogen stack in response to a change in pressure. The methods include generating hydrogen using at least one hydrogen stack, measuring the pressure of the generated hydrogen, and increasing or decreasing the power supplied to the at least one hydrogen stack in response to an increase or decrease in the pressure.

23 Claims, 5 Drawing Sheets

(56)     References Cited

U.S. PATENT DOCUMENTS

| | | | | |
|---|---|---|---|---|
| 8,936,704 | B1 | 1/2015 | Li | |
| 9,461,319 | B2 | 10/2016 | Sudhan et al. | |
| 9,461,320 | B2 | 10/2016 | Ballantine et al. | |
| 9,885,759 | B2 | 2/2018 | Schipfer et al. | |
| 10,573,910 | B2 | 2/2020 | Sudhan S et al. | |
| 10,811,975 | B1 | 10/2020 | Bala et al. | |
| 12,166,373 | B2 | 12/2024 | Utz | |
| 12,394,991 | B2 | 8/2025 | Ballantine et al. | |
| 12,410,532 | B2 | 9/2025 | Srinivasan et al. | |
| 12,470,062 | B2 | 11/2025 | Aghatehrani et al. | |
| 2004/0199294 | A1 | 10/2004 | Fairlie et al. | |
| 2005/0165511 | A1 | 7/2005 | Fairlie et al. | |
| 2007/0179672 | A1 | 8/2007 | Fairlie et al. | |
| 2008/0121525 | A1* | 5/2008 | Doland | C25B 15/08 |
| | | | | 322/29 |
| 2009/0048716 | A1 | 2/2009 | Marhoefer | |
| 2009/0189445 | A1 | 7/2009 | Strizki | |
| 2009/0255826 | A1 | 10/2009 | McWhinney et al. | |
| 2009/0303762 | A1 | 12/2009 | Jang et al. | |
| 2010/0114395 | A1 | 5/2010 | Hinatsu et al. | |
| 2011/0155583 | A1 | 6/2011 | Li | |
| 2013/0093194 | A1 | 4/2013 | Barbachano et al. | |
| 2013/0168236 | A1 | 7/2013 | Zadeh et al. | |
| 2013/0201729 | A1 | 8/2013 | Ahsanuzzaman et al. | |
| 2013/0224614 | A1* | 8/2013 | Fabian | H01M 8/04753 |
| | | | | 429/429 |
| 2014/0021785 | A1 | 1/2014 | Munier et al. | |
| 2014/0079593 | A1 | 3/2014 | Naito et al. | |
| 2015/0001092 | A1 | 1/2015 | Preston et al. | |
| 2015/0072257 | A1 | 3/2015 | Mata et al. | |
| 2015/0293179 | A1 | 10/2015 | Schipfer et al. | |
| 2016/0013729 | A1 | 1/2016 | Josse et al. | |
| 2016/0060776 | A1 | 3/2016 | Kawajiri et al. | |
| 2016/0244890 | A1 | 8/2016 | Petipas et al. | |
| 2019/0245432 | A1 | 8/2019 | Yan et al. | |
| 2019/0259088 | A1 | 8/2019 | Cooper | |
| 2019/0288539 | A1 | 9/2019 | Vela Garcia | |
| 2019/0293722 | A1 | 9/2019 | Choi et al. | |
| 2019/0296403 | A1 | 9/2019 | Ballantine et al. | |
| 2019/0310215 | A1 | 10/2019 | Ballantine et al. | |
| 2019/0312317 | A1 | 10/2019 | Ballantine et al. | |
| 2019/0317151 | A1 | 10/2019 | Ballantine et al. | |
| 2019/0317152 | A1 | 10/2019 | Ballantine et al. | |
| 2020/0010961 | A1 | 1/2020 | Kazuno et al. | |
| 2020/0295594 | A1 | 9/2020 | Reimann et al. | |
| 2021/0104764 | A1 | 4/2021 | Allo | |
| 2021/0155491 | A1 | 5/2021 | Ballantine et al. | |
| 2021/0156038 | A1 | 5/2021 | Ballantine et al. | |
| 2021/0156039 | A1 | 5/2021 | Ballantine et al. | |
| 2021/0179996 | A1 | 6/2021 | Nygren et al. | |
| 2021/0292665 | A1 | 9/2021 | Chishima | |
| 2021/0317588 | A1 | 10/2021 | Falk et al. | |
| 2021/0363651 | A1 | 11/2021 | Seymour et al. | |
| 2021/0384815 | A1 | 12/2021 | Kolar et al. | |
| 2021/0404078 | A1 | 12/2021 | Srinivasan | |
| 2022/0065162 | A1 | 3/2022 | Hunt et al. | |
| 2022/0108262 | A1 | 4/2022 | Cella et al. | |
| 2022/0220620 | A1 | 7/2022 | Dykstra et al. | |
| 2023/0041986 | A1 | 2/2023 | Gu et al. | |
| 2023/0050530 | A1 | 2/2023 | Unru et al. | |
| 2023/0170706 | A1* | 6/2023 | Mabe | H02J 3/381 |
| | | | | 700/291 |
| 2023/0198247 | A1 | 6/2023 | Putz et al. | |
| 2023/0223861 | A1 | 7/2023 | Everts | |
| 2023/0243055 | A1 | 8/2023 | Pmsvvsv | |
| 2023/0302954 | A1 | 9/2023 | Inoue | |
| 2023/0332311 | A1 | 10/2023 | Karuppaiah et al. | |
| 2023/0332312 | A1 | 10/2023 | Karuppaiah et al. | |
| 2023/0332313 | A1 | 10/2023 | Karuppaiah et al. | |
| 2023/0332315 | A1 | 10/2023 | Karuppaiah et al. | |
| 2023/0332316 | A1 | 10/2023 | Karuppaiah et al. | |
| 2023/0333530 | A1 | 10/2023 | Karuppaiah | |
| 2023/0335990 | A1 | 10/2023 | Aghatehrani et al. | |
| 2023/0352934 | A1 | 11/2023 | Steimer et al. | |
| 2024/0124989 | A1 | 4/2024 | Ballantine et al. | |
| 2024/0352608 | A1 | 10/2024 | Srinivasan et al. | |
| 2025/0343422 | A1 | 11/2025 | Ballantine et al. | |

FOREIGN PATENT DOCUMENTS

| | | |
|---|---|---|
| CN | 110445365 A | 11/2019 |
| CN | 112217192 A | 1/2021 |
| CN | 113572158 A | 10/2021 |
| CN | 113690938 A | 11/2021 |
| CN | 114337322 A | 4/2022 |
| CN | 115204929 A | 10/2022 |
| CN | 115358806 A | 11/2022 |
| CN | 115796487 A | 3/2023 |
| CN | 115940284 A | 4/2023 |
| CN | 116109037 A | 5/2023 |
| EP | 4172606 A1 | 5/2023 |
| EP | 4511530 | 2/2025 |
| EP | 4511893 | 2/2025 |
| EP | 4602711 | 8/2025 |
| JP | 2015-050934 | 3/2015 |
| JP | 2017-220963 | 12/2017 |
| JP | 2018-066626 | 4/2018 |
| JP | 2019170097 A | 10/2019 |
| JP | 2023531491 A | 7/2023 |
| JP | 7763793 B2 | 11/2025 |
| KR | 101452642 B1 | 10/2014 |
| KR | 20170046417 A | 5/2017 |
| KR | 20200125483 A | 11/2020 |
| KR | 102306918 B1 | 9/2021 |
| TW | 561673 B | 11/2003 |
| TW | 200633356 A | 9/2005 |
| TW | 202219500 A | 5/2022 |
| TW | I891829 | 8/2025 |
| WO | 2018236649 A1 | 12/2018 |
| WO | 2019189501 A1 | 10/2019 |
| WO | 2020051557 A1 | 3/2020 |
| WO | 2020196889 A1 | 10/2020 |
| WO | 2021263231 A1 | 12/2021 |
| WO | 2023104267 A1 | 6/2023 |
| WO | 2023141219 A2 | 7/2023 |
| WO | 2023205079 A1 | 10/2023 |
| WO | 2023205082 A1 | 10/2023 |
| WO | 2023205090 A1 | 10/2023 |
| WO | 2023205104 A1 | 10/2023 |
| WO | 2023205126 A1 | 10/2023 |
| WO | 2023205139 A1 | 10/2023 |
| WO | 2023205154 A1 | 10/2023 |
| WO | 2024081426 A1 | 4/2024 |

OTHER PUBLICATIONS

PCT Application No. PCT/US2021/039371, International Preliminary Report on Patentability dated Jan. 5, 2023.

PCT Application No. PCT/US23/18822, International Preliminary Report on Patentability dated Oct. 31, 2024.

PCT Application No. PCT/US23/18934, International Preliminary Report on Patentability dated Oct. 31, 2024.

PCT Application No. PCT/US23/18826, International Preliminary Report on Patentability dated Oct. 31, 2024.

PCT Application No. PCT/US23/18851, International Preliminary Report on Patentability dated Oct. 31, 2024.

PCT Application No. PCT/US23/18911, International Preliminary Report on Patentability dated Oct. 31, 2024.

PCT Application No. PCT/US23/18877, International Preliminary Report on Patentability dated Oct. 31, 2024.

PCT Application No. PCT/US23/18953, International Preliminary Report on Patentability dated Oct. 31, 2024.

U.S. Appl. No. 18/136,093, Non-Final Office Action dated Aug. 28, 2024.

U.S. Appl. No. 18/380,083, Non-Final Office Action dated Jan. 28, 2025.

PCT Application No. PCT/US23/35152, International Preliminary Report on Patentability dated Apr. 24, 2025.

TW Application No. 110123618, Office Letter and Search Report dated Mar. 25, 2025.

(56) References Cited

OTHER PUBLICATIONS

U.S. Appl. No. 17/360,153, Non-Final Office Action dated Apr. 17, 2025.
PCT Application No. PCT/US23/18826 International Search Report and Written Opinion dated Oct. 31, 2023.
PCT Application No. PCT/US23/11162 Invitation to Pay Additional Fees dated Apr. 17, 2023.
PCT Application No. PCT/US23/11162 International Search Report and Written Opinion dated Jun. 28, 2023.
PCT Application No. PCT/US23/18822 Invitation to Pay Additional Fees dated Jun. 26, 2023.
PCT Application No. PCT/US23/18877 Invitation to Pay Additional Fees dated Jun. 26, 2023.
PCT Application No. PCT/US2021/039371 International Search Report and Written Opinion dated Oct. 28, 2021.
PCT Application No. PCT/US23/18822 International Search Report and Written Opinion dated Aug. 31, 2023.
PCT Application No. PCT/US23/18934 International Search Report and Written Opinion dated Aug. 31, 2023.
PCT Application No. PCT/US23/18911 International Search Report and Written Opinion dated Jul. 27, 2023.
PCT Application No. PCT/US23/18877 International Search Report and Written Opinion dated Aug. 31, 2023.
PCT Application No. PCT/US23/18953 International Search Report and Written Opinion dated Aug. 4, 2023.
PCT Application No. PCT/US23/18851 International Search Report and Written Opinion dated Oct. 3, 2023.
AE Application No. P6002798/2022, First Office Action dated Apr. 24, 2025.
JP Application No. 2022-578992, Notice of Reasons for Rejection dated Apr. 30, 2025.
PCT Application No. PCT/US23/35152 International Search Report and Written Opinion dated Oct. 31, 2023.
European Search Report Application No. 21829180.5 dated Jun. 24, 2024.

Ding, W. et al., "A Novel Segmented Component Injection Scheme to Minimize the Oscillation of DC-Link Voltage Under Balanced and Unbalanced Conditions for Vienna Rectifier," IEEE Transactions on Power Electronics, vol. 34, No. 10, Oct. 2019, XP011733588, pp. 9536-9551.
Rivera, S. et al., "Electric Vehicle Charging Station Using a Neutral Point Clamped Converter With Bipolar DC Bus," IEEE Transactions on Industrial Electronics, vol. 62, No. 4, Apr. 2015, XP011574565, pp. 1999-2009.
Ye, J. et al., "Simplified Four-Level Inverter-Based Dynamic Voltage Restorer With Single DC Power Source," IEEE Access, vol. 7, Oct. 2019, XP011748357, pp. 137461-137471.
Beskwick et al., "Does the Green Hydrogen Economy Have a Water Problem?", ACS Energy Lett., 2021, vol. 6, pp. 3167-3169 (Year: 2021).
Dozein, M. G. et al., "Fast Frequency Response From Utility-Scale Hydrogen Electrolyzers," in IEEE Transactions on Sustainable Energy, vol. 12, No. 3, pp. 1707-1717, Jul. 2021.
Nguyen, B. L. H. et al., "Power Converter Topologies for Electrolyzer Applications to Enable Electric Grid Services," IECON 2021—47th Annual Conference of the IEEE Industrial Electronics Society, pp. 1-6.
Reinhard Gunther, Power Grid Frequency Why is it Important?, Sep. 28, 2022, Clouglobal, URL: https://clouglobal.com/power-grid-frequency-why-is-it-important/, 4 pages.
U.S. Appl. No. 18/135,431, Non-Final Office Action dated Nov. 25, 2025.
U.S. Appl. No. 18/135,444, Non-Final Office Action dated Dec. 22, 2025.
U.S. Appl. No. 18/135,571, Non-Final Office Action dated Dec. 22, 2025.
U.S. Appl. No. 18/135,902, Non-Final Office Action dated Dec. 16, 2025.
U.S. Appl. No. 18/135,724, Non-Final Office Action dated Oct. 29, 2025.

* cited by examiner

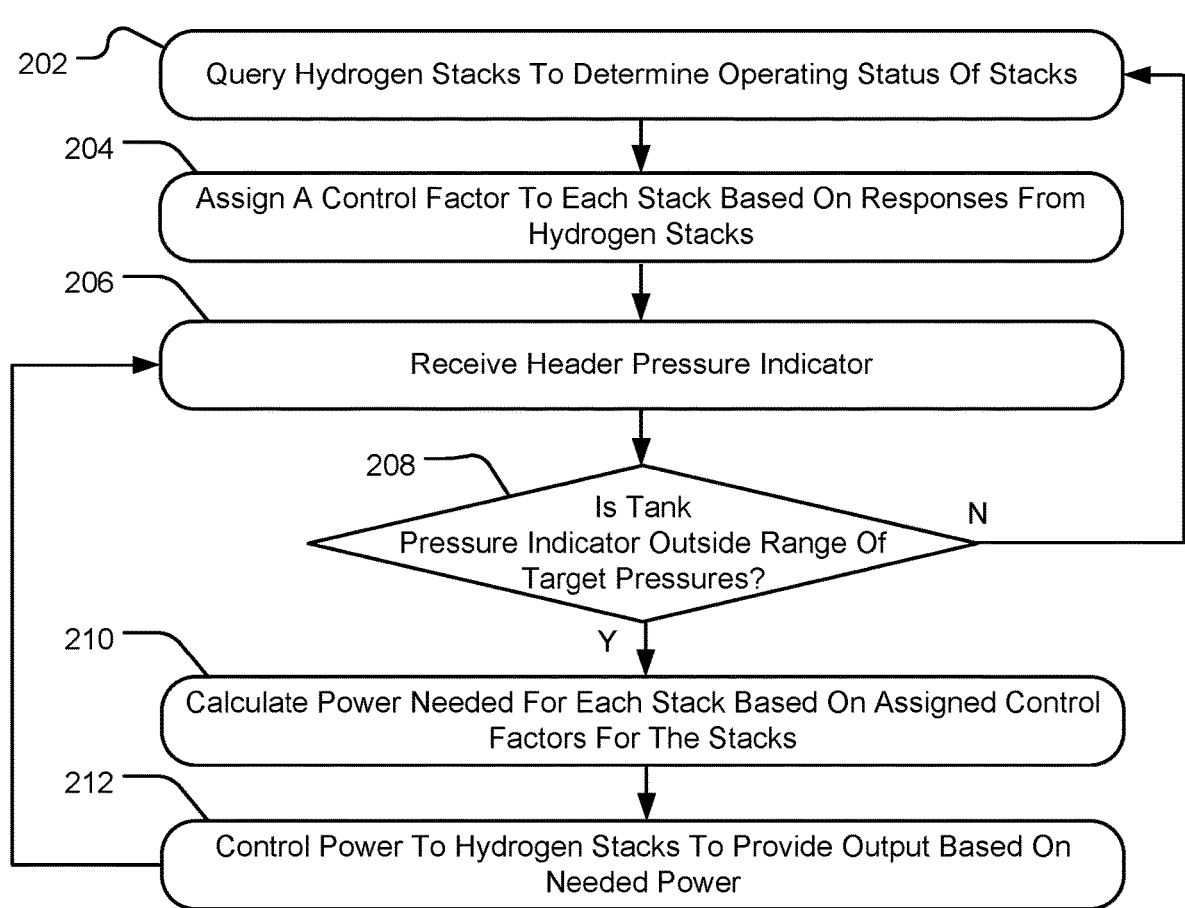

200

202 — Query Hydrogen Stacks To Determine Operating Status Of Stacks

204 — Assign A Control Factor To Each Stack Based On Responses From Hydrogen Stacks 206 — Receive Header Pressure Indicator 208 — Is Tank Pressure Indicator Outside Range Of Target Pressures?    N

Y

210 — Calculate Power Needed For Each Stack Based On Assigned Control Factors For The Stacks 212 — Control Power To Hydrogen Stacks To Provide Output Based On Needed Power

FIG. 2

SYSTEM AND METHOD FOR CONTROLLING HYDROGEN STACK CURRENT AND LOAD

CROSS-REFERENCE TO RELATED APPLICATIONS

This application claims priority to U.S. Provisional Application No. 63/300,911 entitled "SYSTEM AND METHOD FOR CONTROLLING HYDROGEN STACK CURRENT AND LOAD" filed Jan. 19, 2022, the entire contents of which are incorporated by reference herein.

FIELD OF THE DISCLOSURE

The present disclosure relates to systems and methods for controlling hydrogen generator current and load. Accordingly, the disclosure is related to the fields of process engineering and controls engineering.

BACKGROUND

Hydrogen is a common gas that has many industrial uses, such as petroleum refining, metal treatment, food processing, and ammonia production. Hydrogen generation systems, particularly electrolyzers, are becoming increasingly more common. However, although hydrogen is abundant and can be formed from a variety of renewable and nonrenewable energy sources, the combustibility of hydrogen in air makes hydrogen difficult to store and ship. As a result, hydrogen is generally not amenable to large-scale production at a centralized facility for subsequent distribution across large geographical regions. Thus, hydrogen generation is increasingly generated locally at a single site with multiple generators connected in parallel. Controlling of hydrogen production to meet demand at a single site is more complex, particularly when the hydrogen is consumed intermittently or on a time-varying basis. Moreover, as the electrolyzers of the hydrogen generation system age and degrade, they become less efficient, thereby increasing the amount of electricity required by the electrolyzer to generate enough hydrogen to meet demand.

SUMMARY OF THE DISCLOSURE

Described herein is a system for controlling hydrogen stack power and load. The system includes at least one hydrogen stack, wherein the at least one hydrogen stack is supplied with a power to generate hydrogen; a header pressure sensor operable to measure the pressure of the hydrogen generated from the at least one hydrogen stack; and a controller operable to increase or decrease the power supplied to the at least one hydrogen stack to maintain a predetermined header pressure. The controller is in communication with the at least one hydrogen stack and with the header pressure sensor. The amount of power supplied to the at least one hydrogen stack is directly proportional to the amount of hydrogen generated by the hydrogen stack. In some embodiments, the hydrogen stack includes a hydrogen generator and a power cabinet. In some aspects, the hydrogen generator is an electrolyzer. In some embodiments, the system may further include a process application selected from the group consisting of a reactor, a furnace, and a burner. In some aspects, the hydrogen may be supplied directly to the process application. In some embodiments, the at least one hydrogen stack may be at least two hydrogen stacks connected in parallel. In some embodiments, increasing the power to the at least one hydrogen stack increases the amount of hydrogen generated by the at least one hydrogen stack.

Further described herein is a system for controlling hydrogen stack power and load comprising a plurality of hydrogen stacks, wherein each of the plurality of hydrogen stacks are supplied with a power to generate hydrogen; a header pressure sensor operable to measure the combined header pressure of the hydrogen generated from the plurality of hydrogen stacks; and a controller operable to increase or decrease the power supplied to each of the plurality of hydrogen stacks to maintain a predetermined header pressure. The controller is in communication with each of the plurality of hydrogen stacks and with the header pressure sensor. The amount of power supplied to each of the plurality of hydrogen stacks is directly proportional to the amount of hydrogen generated by each of the plurality of hydrogen stacks. The amount of power supplied to each of the plurality of hydrogen stacks is determined according to the age and condition of each of the plurality of hydrogen stacks. In some embodiments, each of the plurality of hydrogen stacks includes a hydrogen generator and a power cabinet. In some aspects, the hydrogen generator is an electrolyzer. In some embodiments, the system further includes at least one of a buffer tank, a compressor, and a storage tank. In some aspects, each of the plurality of hydrogen stacks supplies hydrogen to the at least one of a buffer tank, a compressor, and a storage tank. In some embodiments, each of the plurality of hydrogen stacks is connected in parallel. In some embodiments, the power supplied to each of the plurality of hydrogen stacks is determined by the equation:

$$W = -C \times (P_{header} - P_{set})$$

wherein W is the power supplied to the stack, C is a control factor, $P_{header}$ is the header pressure measured by the pressure header sensor, and $P_{set}$ is a predetermined header pressure. In some aspects, the control factor is determined based upon the age and condition of the hydrogen stack. In some embodiments, the hydrogen stacks having a higher age and/or a poorer condition produce less hydrogen than hydrogen stacks having a lower age and/or better condition.

Further described herein is a method for controlling the power and load for a hydrogen stack. The method includes generating hydrogen using at least one hydrogen stack, wherein the at least one hydrogen stack is supplied with a power; measuring the header pressure of the hydrogen; and adjusting the power based on the header pressure. In some embodiments, the hydrogen stack includes a hydrogen generator and a power cabinet. In some aspects, the hydrogen generator is an electrolyzer. In some embodiments, the method further includes comparing the header pressure of the hydrogen to a predetermined header pressure.

Further described herein is another method for controlling the power and load for a hydrogen stack. The method includes generating hydrogen using a plurality of hydrogen stacks, wherein each of the plurality of hydrogen stacks is supplied with a power; measuring the combined header pressure; and adjusting the power to each of the plurality of hydrogen stacks based on the combined header pressure and the age and/or the condition of each of the plurality of hydrogen stacks. In some embodiments, each of the plurality of hydrogen stacks includes a hydrogen generator and a power cabinet. In some aspects, the hydrogen generator includes an electrolyzer. In some embodiments, the method further includes comparing the combined header pressure of the hydrogen to a predetermined header pressure. In some embodiments, the power supplied to each of the plurality of hydrogen stacks is adjusted according to the equation:

$$W = -C \times (P_{header} - P_{set})$$

wherein W is the power supplied to the stack, C is a control factor, $P_{header}$ is the header pressure measured by the pressure header sensor, and $P_{set}$ is a predetermined header pressure. In some aspects, the control factor is determined based upon the age and condition of the hydrogen stack. In some embodiments, the hydrogen stacks having a higher age and/or a poorer condition produce less hydrogen than hydrogen stacks having a lower age and/or better condition. In some embodiments, the method further includes determining a control factor for each of the plurality of hydrogen stacks.

BRIEF DESCRIPTION OF THE FIGURES

FIG. 2 shows an exemplary method for load sharing between a plurality of hydrogen stacks of the load sharing system of the present disclosure.

DETAILED DESCRIPTION

Described herein are systems and methods for controlling hydrogen stack current and load. As hydrogen generation systems become large and more complex (e.g., multiple generators connected in parallel, high pressure, etc.) the systems to control hydrogen generation also increase in complexity. The systems and methods described herein provide high-precision control of hydrogen generation and electricity use, thereby increasing the efficiency of the overall process.

Figure 1:
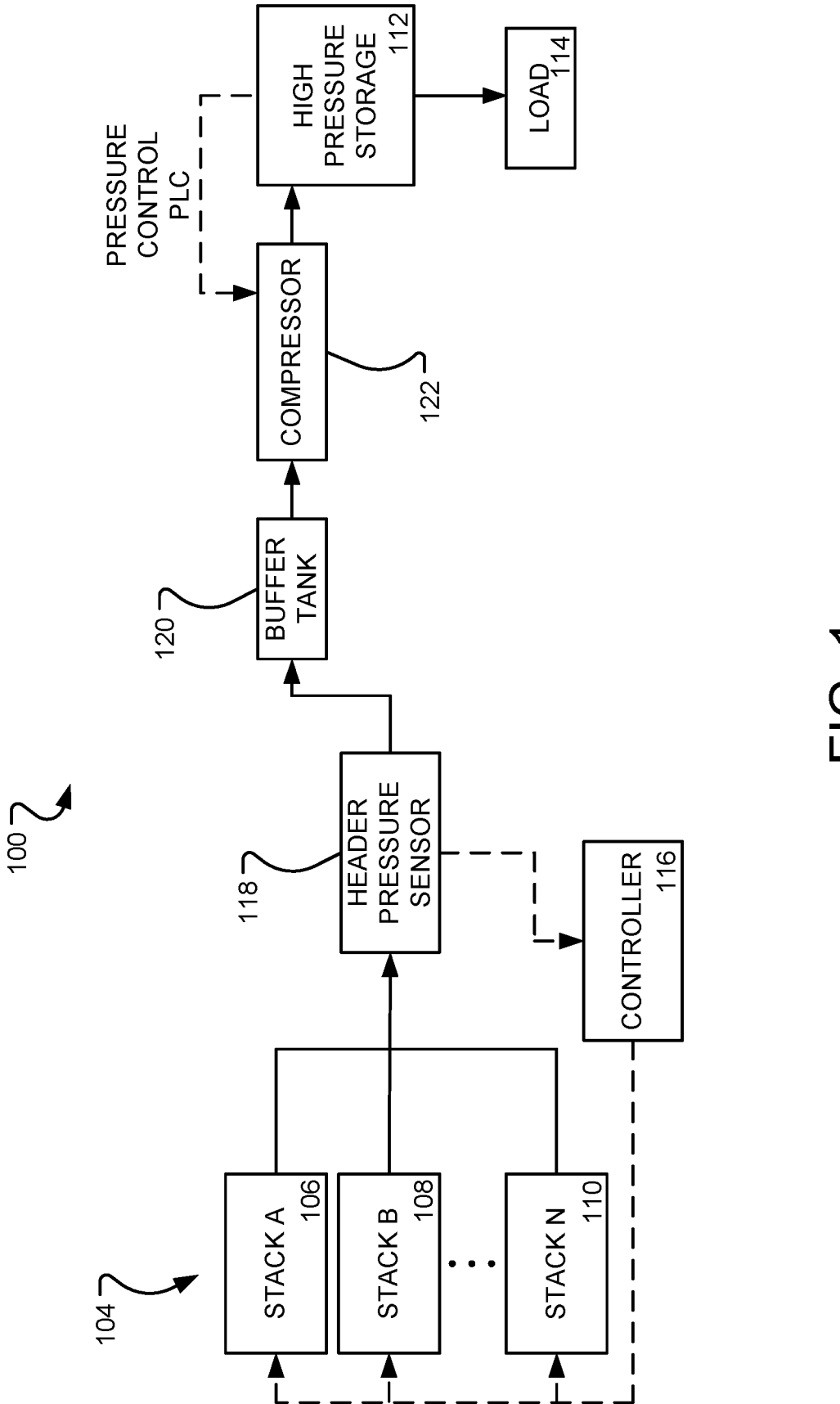
FIG. 1 shows an exemplary load sharing system of the present disclosure.

Described herein is a system 100 for controlling hydrogen stack power and load. In one implementation, the system 100 may include components configured and designed to generate hydrogen housed in a container, outdoor-rated cabinets, or multiple systems contained within a plant site. In one implementation, the system 100 may be a clean hydrogen facility that generate hydrogen through a process known as electrolysis. In general, electrolysis (i.e., in the context of zero-carbon production of hydrogen) is a rapidly growing and enabling technology that provides a preferable and sustainable alternative to fossil fuels and the resulting environmentally harmful $CO_2$ emissions. Electrolysis is the process of using electricity to split water into hydrogen and oxygen, with this reaction taking place in a unit called an "electrolyzer". Often, the hydrogen generating system 100 may include a plurality of such electrolyzers in an electrolyzer stack 104. Exemplary electrolyzer stacks suitable for use in the systems of the present disclosure are described in U.S. application Ser. No. 17/101,232 entitled "Electrochemical Devices, Modules, and Systems for Hydrogen Generation and Methods of Operating Thereof", filed Nov. 23, 2020, the entire contents of which are incorporated by reference herein. As illustrated in FIG. 1, the electrolyzer stack 104 may include any number of electrolyzers or stacks of electrolyzers, such as stack A 106, stack B 108, and through stack N 110. Through the electrolysis process, the electrolyzers 104 create hydrogen gas. Most electrolyzers 104 include an anode and a cathode separated by an electrolyte in the presence of water. As energy, such as a direct-current (DC) power, is applied, the water molecules react at the anode to form oxygen and positively charged hydrogen ions. The hydrogen ions flow through the electrolyte to the cathode to bond with electrons and form hydrogen gas. The leftover oxygen may be released into the atmosphere or can be captured or stored to supply other industrial processes or even medical gases, in some cases. The hydrogen gas can either be stored as a compressed gas or liquefied, and since hydrogen is an energy carrier, it can be used to power such hydrogen fuel cell electric applications as trains, buses, trucks, or data centers. As explained in more detail below, the hydrogen gas may be stored in one or more storage tanks 112 and provided to various loads 114 from the storage tank. For example, the generated hydrogen may be provided to one or more downstream industrial plants for asset production, such as steel, cement, oil, fertilizer, and the like.

Electrolyzers 104 can range in size from small equipment, well-suited for modest-scale distributed hydrogen production to large-scale, central production facilities, capable of being sequenced directly to renewable or other non-greenhouse-gas-emitting forms of electricity production. Electrolyzers 104 offer a route to produce clean hydrogen to power hydrogen fuel cells, supply industrial processes or produce green chemicals like fertilizers, renewable natural gas, and methanol. Some electrolyzers 104 may be configured through a connection of various electrolytic cells, with each cell comprising a small electrolyzer. In one implementation, the electrolyzer stack 104 may include the multiple cells connected in series in a bipolar design, although other configurations are possible. In an exemplary embodiment, the electrolyzer 104 may be a proton exchange membrane (PEM)-based electrolyzer. In some embodiments, the system may include only one hydrogen stack. In some additional embodiments, the system may include a plurality of hydrogen stacks. In some aspects, the plurality of hydrogen stacks may be connected in parallel.

Each of hydrogen stacks 104 may include a hydrogen generator and a power cabinet. The hydrogen generator is operable to produce hydrogen while the power cabinet provides the necessary power to the corresponding stack 104 to operate. The power cabinet is operable to supply a current and/or voltage to the hydrogen generator and, in some instances, may rectify and convert an alternating current (AC) power source to direct current (DC) power. In some embodiments, the power cabinet may include firmware to control the DC current supplied to the hydrogen generator, thereby controlling the amount of hydrogen produced by the hydrogen generator. In some embodiments, a controller 116 may be in communication with each power cabinet of the stacks 104 to control an amount of power provided to each stack. Operation of the controller 116 to control the amount of power provided to each stack is described in more detail below with reference to the method 200 of FIG. 2.

As described, the output from each stack 104 may be provided to a high pressure storage tank 112 for storage from which a load 114 may receive the produced hydrogen. Several components may connected between the stacks 104 and the high pressure storage 112, including but not limited to, a header pressure sensor 118, a buffer tank 120, and a compressor 122. The header pressure sensor is generally operable to measure the pressure of the hydrogen generated by the hydrogen generators 104 as stored in the buffer tank 120. The buffer tank 120 may store the hydrogen generated by the stacks 104 at a first pressure, as measured by the header pressure sensor 118. The hydrogen stored in the buffer tank 120 may be compressed through compressor 122 and stored under a higher pressure in high pressure storage 112 for delivery to the load 114. A programmable logic controller may control the pressure of the high pressure storage 112 through receiving a pressure measurement from the storage and adjusting or operating the compressor 122 to maintain the pressure of the storage at a particular level or range of pressures. In this manner, hydrogen generated by the stacks 104 may be pressurized and stored in the high pressure storage 112 for the various loads 114.

The header pressure sensor 118 may be any pressure sensor known to those having skill in the art. An increase in the header pressure as measured by the header pressure sensor 118 may indicate that the amount of hydrogen generated by the hydrogen stacks is greater than the amount of hydrogen consumed by the process application (e.g., the hydrogen compressed and stored in the high pressure storage 112). Accordingly, a decrease in the header pressure may indicate that the amount of hydrogen generated by the hydrogen stacks 104 is less than the amount of hydrogen consumed by the process application. Those having skill in the art will appreciate that as the header pressure changes, the amount of hydrogen generated by the hydrogen stack 104 and the power applied to the hydrogen stack may be adjusted in order to maintain optimal processing conditions within the operational flow of the system 100. In some embodiments, the header pressure of the system may be predetermined. Further, the header pressure sensor 118 may be operable, in some instance, to measure the header pressure from a single hydrogen stack. In other implementations, the header pressure sensor 118 may be operable to measure the combined header pressure from a plurality of hydrogen stacks 104.

In general, the controller 116 is operable, among other functions, to increase or decrease the power supplied to the hydrogen stack, thereby controlling the amount of hydrogen produced by one or more of the hydrogen stacks 104. The controller 116 is in communication with the hydrogen stack 104 and with the header pressure sensor 118 and is operable to receive and transmit data to/from the hydrogen stack and to/from the header pressure sensor. In some embodiments, the controller 116 may be a proportional controller (P), a proportional-integral controller (PI), a proportional-integral-derivative controller (PID), or any other controller known to those having skill in the art. In some embodiments, the controller 116 may be operable to adjust power provided to the hydrogen stack 104 in response a pressure measurement received from the header pressure sensor 118. In particular, FIG. 2 is a flowchart of a method 200 for the controller 116 to load share between a plurality of hydrogen stacks of the load sharing system 100 of the present disclosure. Although described herein as performed by the controller 116, it should be appreciated that one or more of the operations of the method 200 may be performed by other components of the system 100 (such as the header pressure sensor 118 or one or more components of the individual stacks 104) or any other computing device associated with the load sharing system.

At operation 202, the controller 116 may communicate with the one or more stacks 104 to determine an operating condition or status of the stacks. In general, hydrogen stack production may degrade as the stack ages or based on operational hours of the stack such that older stacks may be less efficient in comparison to newer hydrogen stacks. Other factors, such as manufacturing flaws, differences in operating conditions (such as power provided, ambient temperature, etc.), connection to other stacks, etc. may negatively affect the efficiency of a stack 104 over a long period of time. Thus, operational conditions of the hydrogen stacks 104 may vary from stack to stack and even electrolyzer to electrolyzer. To determine an operational condition for each stack 104 of the system 100, the controller 116 may inject a test AC signal onto the power signal provided to one or more of the stacks 104 and measure a corresponding response. By measuring the response, the AC impedance, condition of the ionic layers, water and oxygen mass transport, charge transport of the catalyst layer, and other parameters may be determined. The parameters can be combined to determine the condition of the stack, which may then be translated to a numerical value indicative of the operational status of the one or more stacks 104. Other procedures for determining the operating status of the stacks 104 may be utilized by the controller 116 to determine the state of the stacks 104. Some such procedures are discussed in more detail in co-pending U.S. patent application Ser. No. 17/360,153 entitled "Impedance Monitoring of a Modular Electrolysis System", filed on Jun. 28, 2021, the entirety of which is incorporated by reference herein.

Once the operational conditions of the stacks 104 are determined, a control factor may be assigned to each stack under test in operation 204. In general, the control factor may represent the age and condition of the stacks 104 and may be determined through any method discussed above. In some instances, the control factor for a stack may correspond to a relationship between power provided to the stack and the hydrogen production of that stack based on the provided power. As a stack ages or degrades, a higher power may be needed to produce the same amount of hydrogen in comparison to a newer stack. Thus, the control factor associated with an older hydrogen stack may be higher than a control factor associated with a newer stack. For example, stack A 106 of system 100 may be installed and operating within the system to produce hydrogen for storage in the high pressure storage 112. At some later date, the system 100 may be upgraded and additional stacks may be added, such as stack B 108. Because stack B 108 is newer than stack A 106 and has been operating for less time, stack B may be more efficient in generating hydrogen than stack A. Through the operations above, the controller 116 may determine that stack A 106 has a control factor of "2" while stack B 108 has a control factor of "1". In general, any numerical value may be assigned or associated with a stack 104 based on the performance response of the individual stacks. However, if stack A 106 and stack B 108 have a similar operational response, the control factor assigned to the stacks may be similar or the same. In this manner, the control factor may comprise a numerical value that corresponds to an operational status of a stack or plurality of stacks of the system 100.

At operation 206, the controller 116 may receive a signal from the header pressure sensor 118 corresponding to a pressure measurement at the buffer tank 120. More specifically, the buffer tank 120 may be filled with the hydrogen generated by the stack 104. The stored hydrogen in the buffer tank 120 may be withdrawn through the compressor 122 to fill the high pressure storage 112, particularly as hydrogen is provided to load 114. Thus, the pressure in the buffer tank 120 may vary based on demand by the load 114 and stack production may be controlled by controller 116 in response to the demand. In general, as more hydrogen is provided from high pressure storage 112 to the load 114, stack production may be increased to replace the provided hydrogen. In some instances, the system 100 may attempt to maintain a pressure range within the buffer tank 120 to ensure that the high pressure storage 112 is not depleted. For example, the controller 116 may be configured to maintain a pressure within the buffer tank 120 of 400-500 psi. In general, the optimal or target range for the buffer tank pressure may be any range as determined by the controller 116 or other operating system.

In operation 208, the controller 116 may determine if the received header pressure indicator is outside the target pressure range for the buffer tank 120. If the received header pressure indicator is within the target pressure range for the buffer tank 120, the controller 116 may return to operation 202 and continue to determine the operational status of the stacks 104 of the system 100. Determination of the operational status of the stacks 104 may occur periodically or based on an operational condition or state of the system, such as upon boot-up of the system or following an increase or decrease in stack production. For example, the received header pressure indicator may indicate that the pressure within the buffer tank 120 is 450 psi, while the target range of buffer tank pressure is 400-500 psi. In this example, the controller 116 may control the power provided to the stacks 104 to maintain the current hydrogen production of the stacks as the pressure within the buffer tank is within the acceptable range. The controller 116 may further conduct a query of the stacks to monitor for changes in the operational status of the stacks 104 and re-assign one or more control factors to the stacks 104 based on the determined operating statuses.

Figure 3A:
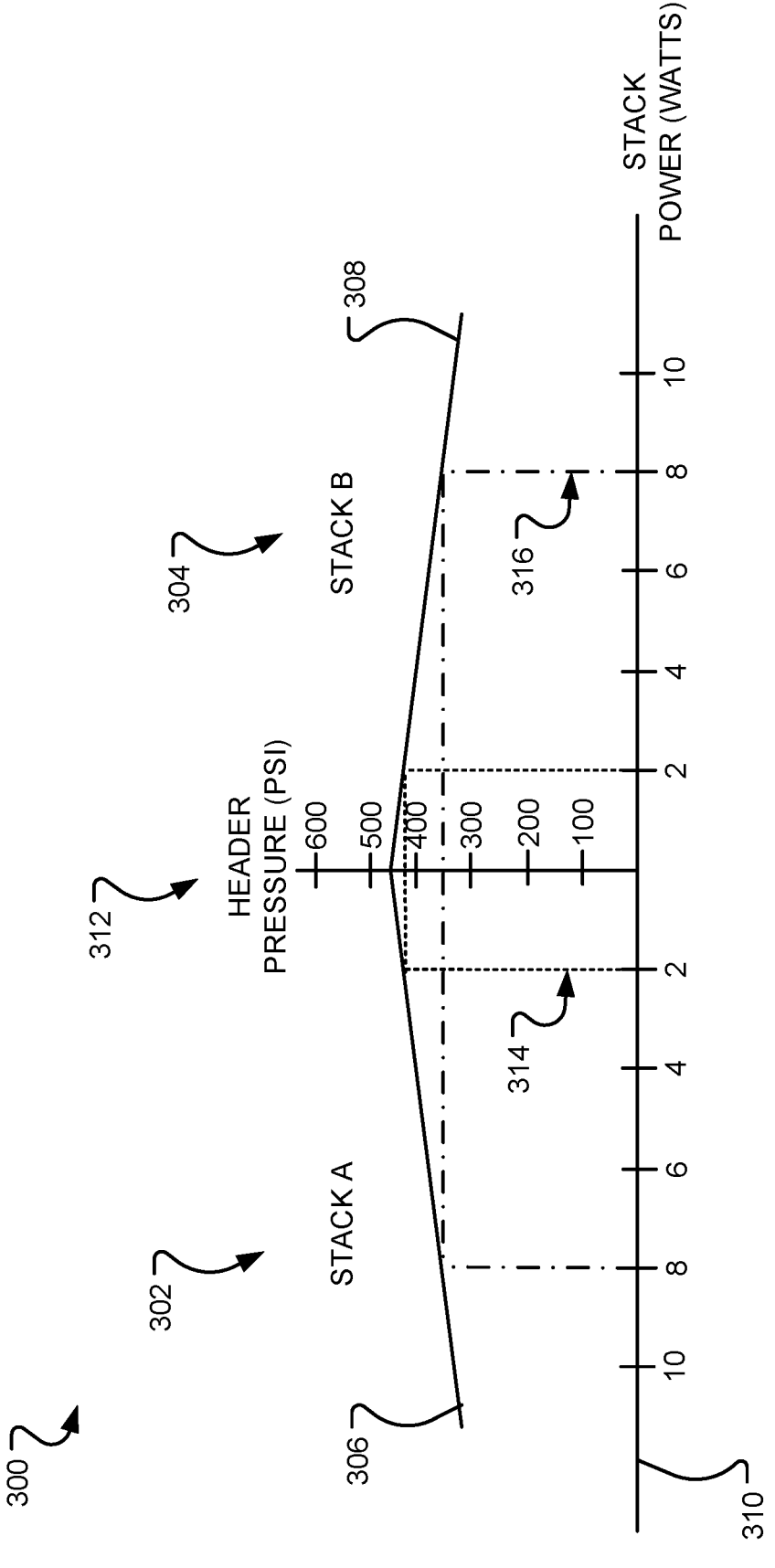
FIG. 3A shows the power supplied to two hydrogen stacks in a load sharing system under different a first stack operating condition.

If the received header pressure indicator is outside the target pressure range for the buffer tank 120 as determined in operation 208, the controller 116 may respond by calculating a power needed for each of the hydrogen stacks 104 based on the control factors assigned to each stack in operation 210. For example, FIG. 3A is a graph 300 illustrating the power supplied to a first condition of two hydrogen stacks in a load sharing system under different process conditions. The graph 300 includes a power, in watts, provided to a stack along an x-axis 310 and a header pressure, in psi, along a y-axis 312. Although illustrated in FIG. 3A as ranging from 0 watts to 10 watts, the power provided to the stacks 104 may include any power range, such as from 0 watts to 600 kilowatts. Thus, it should be appreciated that the values provided herein are merely examples and the values may range through any values of a corresponding unit. In general, the power provided to the stacks may be adjusted in proportion to the number of cells in the stack 104. In addition, the graph 300 illustrates a visual indicator of control factors associated with stack A 302 and stack B 304. In particular, as the control factor may be a value corresponding to a correlation between power provided to a stack and the hydrogen generated by that stack, the control factor may be illustrated as a sloped line, such as sloped line 306 for stack A 302 and slope line 308 for stack B 304. In this example, the control factor 306, 308 for the stacks 302, 304 are similar such that the slope of the control factor line is similar. It should be appreciated that the graph 300 of FIG. 3A is for illustrative purposes only and that it is not necessary that the controller 116 generate a similar graph when controlling the power supplied to the stacks 104 for share loading.

The graph 300 of provides an illustration of determining the power for the various stacks 104 of the system 100 based on the received header pressure indicator. For example, at condition one (illustrated through dashed line 314) and based on the control factor 306 of stack A 302, two watts of power may be provided to maintain the header pressure at approximately 425 psi. As stack B 304 and stack A 302 have similar control factors, stack B may also be supplied with two watts of power to generate or maintain the header pressure at 425 psi. However, as the pressure in the buffer tank 120 drops due to refilling of the high pressure storage 112, the header pressure measurement 312 may also drop. Thus, at condition two (illustrated through dashed line 316), the header pressure is measured at around 350 psi. This buffer tank 120 pressure may be outside the acceptable range of header pressure measurements such that additional hydrogen may be generated to refill the buffer tank 120 back to an acceptable pressure. The increase in power needed in response to the header pressure may be determined by the controller 116. For example, at a header pressure of 350 psi, the controller 116 may determine that the power provided to each of stack A 302 and stack B 304 may be 8 watts, as illustrated through dashed line 316. The determined power for the stacks 302, 304 may be based on the corresponding control factor 306, 308 for the stacks as determined above. Similarly, if the header pressure of the buffer tank 120 is 450 psi or more, the power to the hydrogen stacks 302, 304 may be turned off (corresponding to a stack power of zero watts). The stacks 302, 304 may continue to be turned off until the header pressure 312 drops below 450 psi, at which point control of the power provided to the stacks may continue to follow the control factor 306, 308 for the stacks illustrated in graph 300.

Figure 3B:
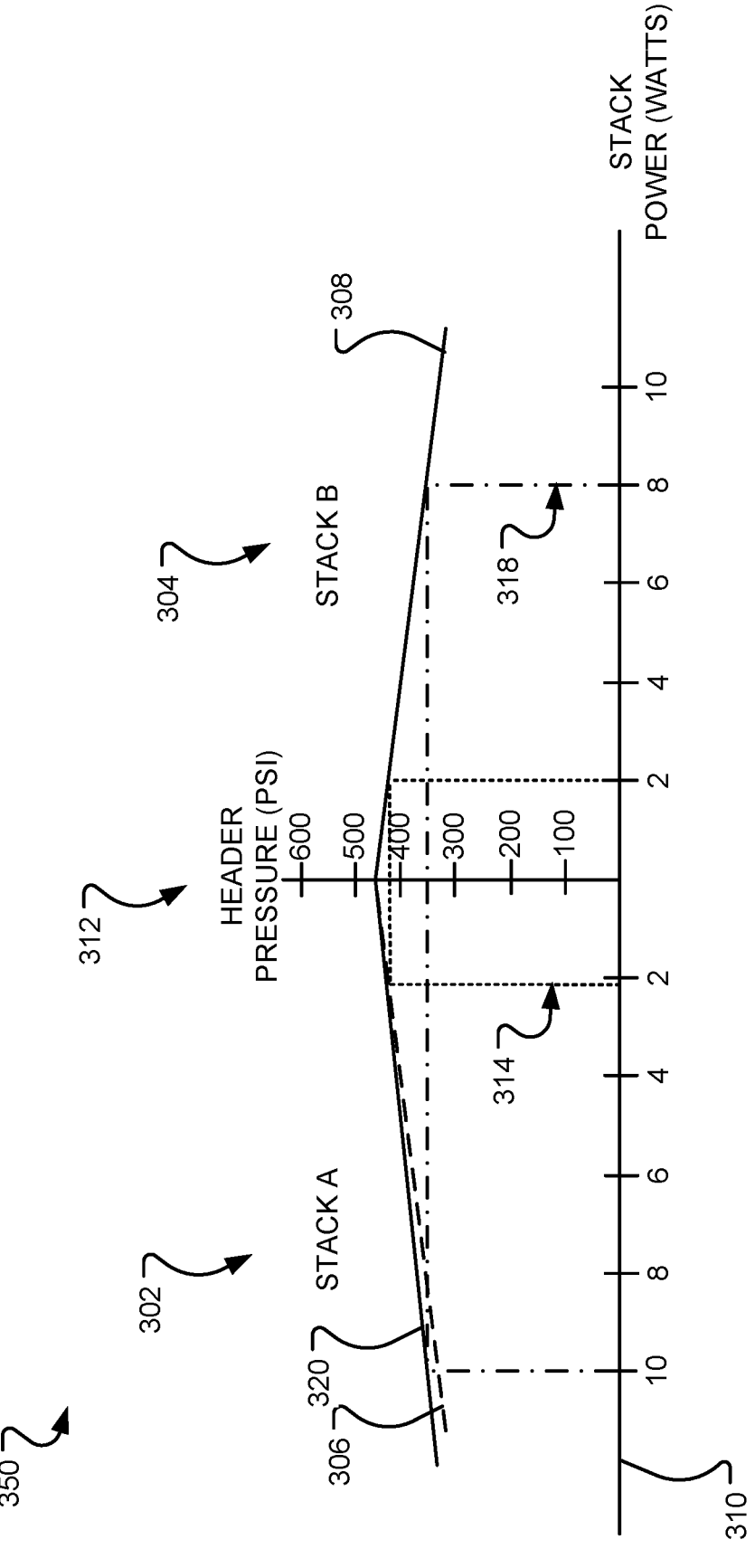
FIG. 3B shows the power supplied to two hydrogen stacks in a load sharing system under different a second stack operating condition.

As mentioned above, the efficiency of stacks 104 may degrade over time such that the control factor assigned to a stack may be adjusted in response. For example, FIG. 3B is a graph 350 illustrating the power supplied to a second condition of two hydrogen stacks in a load sharing system under different process conditions. In general, graph 350 of FIG. 3B is similar to graph 300 of FIG. 3A illustrating a graphed control factor 306, 308 for stack A 302 and stack B 304 as stack power 310 to header pressure 312. However, in this example, stack A 302 has been determined to be degraded such that the corresponding control factor is illustrated with a different slope than in the example of FIG. 3A. In particular, the original control factor 306 is illustrated as a dotted line in graph 350. As the performance or efficiency of stack A decreases, the slope of the control factor may become flatter, as illustrated by slope 320 of graph 350. In application, the flatter slope of the new control factor 320 as the stack degrades results in a higher power needed to generate a corresponding hydrogen output. For example, a third condition is illustrated in graph 350 as dashed line 318. In this example, a header pressure of 350 psi is received and the controller 116 may determine, based on the control factor 308 of stack B 304, that a power to stack B of 8 watts should be provided. However, due to the new control factor 320 of degraded stack A 302, the power supplied to stack A in response to the header pressure of 350 psi is 10 watts, up from 8 watts of the previous example. Thus, in general, as the efficiency of a stack increases, the power needed in response to a header pressure indicator may also increase. In other words, more power to the stack may be needed in response to the drop in efficiency for the stack. In this manner, the controller 116 may determine and use the different control factors for the various stacks 104 of the system 100 to determine a power to supply to each stack in response to a received header pressure.

Returning to the method 200 of FIG. 2, the controller 116 may control power supplied to one or more of the hydrogen stacks 104 to provide the needed hydrogen output to maintain the buffer tank 120 within an acceptable range of pressures at operation 212. In one implementation, the controller 116 may communicate with a power cabinet or other power providing device or system associated with the stacks 104. Controlling the power provided to the one or more of the hydrogen stacks 104 may include adjusting a current and/or a voltage to the stack. Through this communication, the controller 116 may request a particular amount of power be supplied to one or more of the stacks 104. For example and based on the graphs of FIG. 3B, the controller 116 may control a power supply system to provide 8 watts of power to stack B 108 and 10 watts of power to stack A 106. The requested power to the different stacks may be based on the header pressure indicator received from the header pressure sensor 118 and/or one or more control factors associated with one or more of the stacks 104 of the system 100. Thus, through the method 200 of FIG. 2, the controller 116 may adjust the power provide to the stacks 104 of the system 100, and correspondingly the hydrogen production of the stacks, in response a measured pressure at the buffer tank 120. Further, the adjustment to the production of the stacks 104 may be based on a determined operating condition of the stacks as quantified in the control factor associated with each stack.

The method described above may be utilized in many hydrogen production systems. For example, in a load sharing system, the power supplied to a plurality of hydrogen stacks 104 may be controlled by the controller 116 in response to the combined header pressure from each of the hydrogen stacks, as measured by the header pressure sensor 118. Load sharing systems are most useful when the hydrogen output is supplied to a downstream process unit that will create a time-varying hydrogen header pressure. In other instances, a dynamic output hydrogen generation system is disclosed. When used as a dynamic output system, the controller 116 throttles the power supplied to the hydrogen stack 104 to increase or decrease hydrogen generation by the stacks based on a load 114. In general, dynamic output systems may be most useful when the hydrogen generated is applied directly to a load 114 that consumes or uses hydrogen at a non-time-varying rate, rather than being stored or used intermittently. For example, the load may be a burner, a furnace, or a reactor.

In a load sharing system, the controller adjusts the power supplied to the plurality of stacks 104 based on changes in the header pressure associated with the buffer tank 120. Additionally, the controller 116 may be operable to adjust the power supplied to each of the plurality of stacks 104 based on an operating condition and/or the age of each stack. In some embodiments, the controller 116 directs more power to stacks that are older and/or in more degraded condition than stacks which are newer. As more degraded stacks 104 may require more power to produce the same amount of hydrogen, more power may be supplied to older, less efficient stacks to ensure that those stacks are producing a shared amount of output hydrogen. Additionally, if one of the plurality of stacks 104 becomes inoperable or must be temporarily powered down, the controller 116 may be operable to automatically adjust the power supplied to the remaining stacks to compensate for the loss of the down stack.

In some embodiments, the system 100 may provide an increase in efficiency of about 10% to about 25% compared to a system that does not include a load sharing system. The increase in efficiency may be measured as a function of the amount of hydrogen generated and the amount of electricity consumed.

To determine which stacks are newer and/or in better condition, each of the stacks may be assigned a control factor, as described above. Further, the controller 116 may be configured to control hydrogen generation using a plurality of hydrogen stacks 104, measuring the combined header pressure of the hydrogen, and adjusting the power to each of the plurality of hydrogen stacks based on the combined header pressure and the control factor of each of the plurality of hydrogen stacks. In some embodiments, the method may also include comparing the combined header pressure to a predetermined header pressure. For example, a stack power may be adjusted according to the formula:

$$W = -C \times (P_{header} - P_{set})$$

wherein W is the power supplied to the stack, C is a control factor of the stack, $P_{header}$ is the combined header pressure measured by the pressure header sensor, and $P_{set}$ is a predetermined header pressure.

In some embodiments, the system 100 may be used to control the hydrogen stack power and load across a plurality of hydrogen generators supplying hydrogen to a plurality of loads. In some aspects, the controller 116 may be operable to adjust the flow of hydrogen to different loads. In some additional aspects, the controller 116 may be operable to adjust which of the plurality of loads each hydrogen stack supplies hydrogen to, thereby providing further increases to the overall efficiency of the site.

In some embodiments, the controller 116 is operable to throttle the power supplied to the hydrogen stack 104 as the header pressure changes. Using the example illustrated in graph 300 of FIG. 3A, the controller 116 may provide 8 watts of power to the stacks 104 of the system 100 in response to a header pressure measurement of 350 psi. This power may cause the stacks 104 to produce additional hydrogen such that the pressure within the buffer tank 120 may begin to rise. As the header pressure measurements increase, the controller 116 may reduce the power supplied to the stacks 104 corresponding to the control factors 306, 308 associated with the stacks 104. For example, as the header pressure reaches 425 psi, the supplied power to the stacks 104 may be 2 watts. In this manner, the supplied power may be throttled as the header pressure approaches an acceptable range of pressures. Once the header pressure returns to the predetermined header pressure or within the predetermined header pressure range, the controller 116 may decrease the power to the stacks 104 to decrease the rate of hydrogen generation such that the header pressure remains constant at the predetermined header pressure. Similarly, if the header pressure increases from the predetermined header pressure, the controller 116 decreases the current supplied to the hydrogen stack to decrease the rate of hydrogen generation until the header pressure returns to the predetermined header pressure. In some instances, the controller 116 may be configured to throttle down the power to the hydrogen stack 104 as the header pressure approaches the predetermined header pressure to avoid overshooting the predetermined header pressure.

In some embodiments, the controller 116 may begin to adjust the current within seconds after the change in header pressure is detected. For example, the controller 116 may begin to adjust the current within 60 seconds, 30 seconds, 20 seconds, 10 seconds, or 5 seconds after the change in header pressure is detected. In some embodiments, the controller 116 may adjust the pressure in a shorter amount of time if the change in header pressure is high. Further, in some embodiments, the controller 116 may complete the current adjustment within seconds. For example, the controller 116 may complete the current adjustment within 60 seconds, 30 seconds, 20 seconds, 10 seconds, or 5 seconds. In some embodiments, the controller 116 may complete the current adjustment faster if the change in header pressure is high.

Those having skill in the art will appreciate that the amount of a header pressure change or deviation from a predetermined header pressure required to cause the controller 116 to adjust the power may be chosen based on a number of factors, e.g., the types of loads in the system, the number of hydrogen stacks, the sensitivity of changing loads on the system, etc.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present systems and methods, which, as a matter of language, might be said to fall therebetween.

Figure 4:
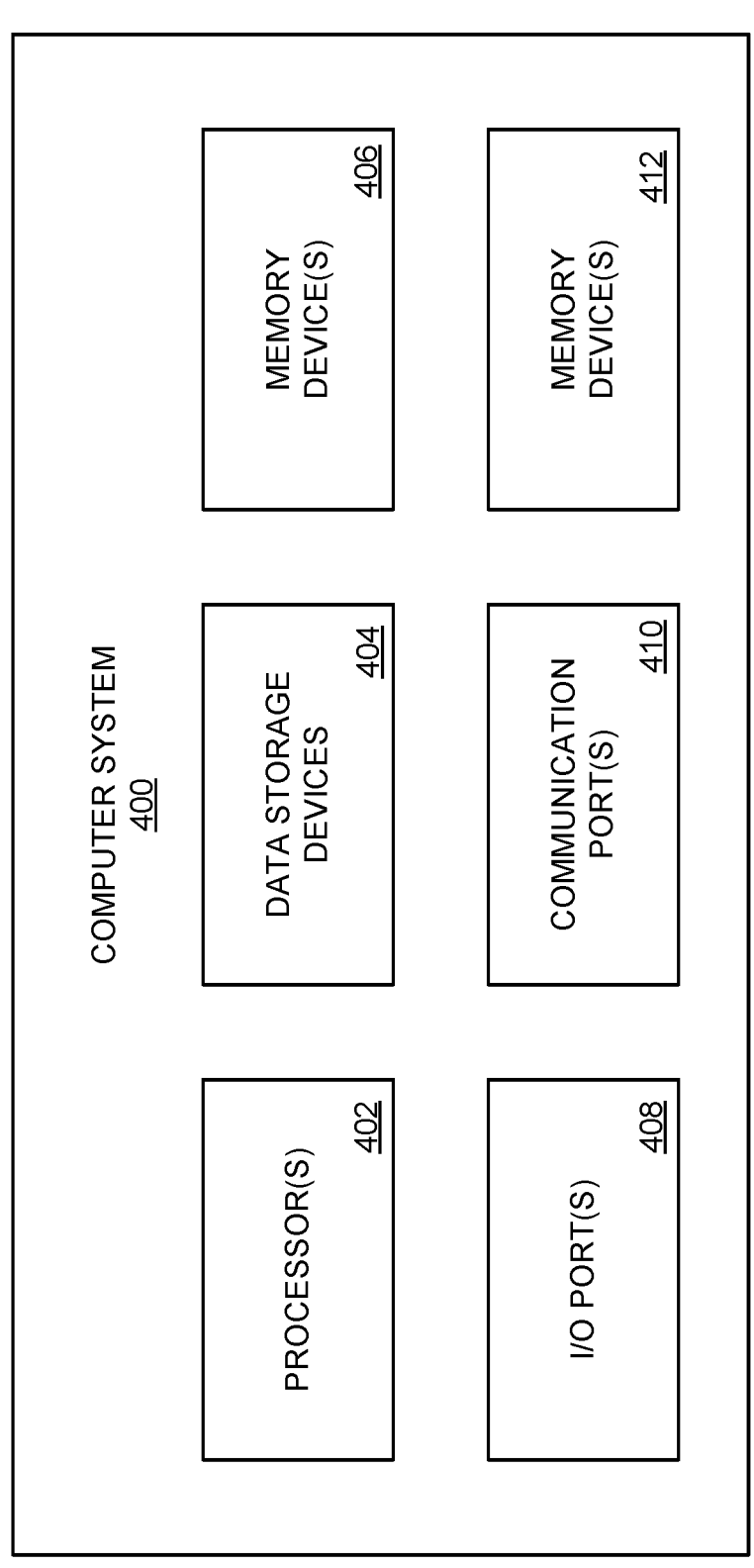
FIG. 4 shows an exemplary computing system which may be used in implementing embodiments of the present disclosure.

Referring to FIG. 4, a detailed description of an example computing system 400 having one or more computing units that may implement various systems and methods discussed herein is provided. The computing system 400 may be part of a controller 116, may be in operable communication with various implementation discussed herein, may run various operations related to the method discussed herein, and may be part of overall systems discussed herein. The computing system 400 may be applicable to, for example, the controller 116 discussed with respect to the various figures and may be used to implement the various methods described herein. It will be appreciated that specific implementations of these devices may be of differing possible specific computing architectures, not all of which are specifically discussed herein but will be understood by those of ordinary skill in the art. It will further be appreciated that the computer system may be considered and/or include an ASIC, FPGA, microcontroller, or other computing arrangement. In such various possible implementations, more or fewer components discussed below may be included, interconnections and other changes made, as will be understood by those of ordinary skill in the art.

The computer system 400 may be a computing system that is capable of executing a computer program product to execute a computer process. Data and program files may be input to the computer system 400, which reads the files and executes the programs therein. Some of the elements of the computer system 400 are shown in FIG. 4, including one or more hardware processors 402, one or more data storage devices 404, one or more memory devices 406, and/or one or more ports 408-412. Additionally, other elements that will be recognized by those skilled in the art may be included in the computing system 400 but are not explicitly depicted in FIG. 4 or discussed further herein. Various elements of the computer system 400 may communicate with one another by way of one or more communication buses, point-to-point communication paths, or other communication means not explicitly depicted in FIG. 4. Similarly, in various implementations, various elements disclosed in the system may or not be included in any given implementation.

The processor 402 may include, for example, a central processing unit (CPU), a microprocessor, a microcontroller, a digital signal processor (DSP), and/or one or more internal levels of cache. There may be one or more processors 402, such that the processor 402 comprises a single central-processing unit, or a plurality of processing units capable of executing instructions and performing operations in parallel with each other, commonly referred to as a parallel processing environment.

The presently described technology in various possible combinations may be implemented, at least in part, in software stored on the data stored device(s) 404, stored on the memory device(s) 406, and/or communicated via one or more of the ports 408-412, thereby transforming the computer system 400 in FIG. 4 to a special purpose machine for implementing the operations described herein.

The one or more data storage devices 404 may include any non-volatile data storage device capable of storing data generated or employed within the computing system 400, such as computer executable instructions for performing a computer process, which may include instructions of both application programs and an operating system (OS) that manages the various components of the computing system 400. The data storage devices 404 may include, without limitation, magnetic disk drives, optical disk drives, solid state drives (SSDs), flash drives, and the like. The data storage devices 404 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 406 may include volatile memory (e.g., dynamic random-access memory (DRAM), static random-access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 404 and/or the memory devices 406, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 400 includes one or more ports, such as an input/output (I/O) port 408, a communication port 410, and a sub-systems port 412, for communicating with other computing, network, or vehicle devices. It will be appreciated that the ports 408-412 may be combined or separate and that more or fewer ports may be included in the computer system 400. The I/O port 408 may be connected to an I/O device, or other device, by which information is input to or output from the computing system 400. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 400 via the I/O port 408. In some examples, such inputs may be distinct from the various system and method discussed with regard to the preceding figures. Similarly, the output devices may convert electrical signals received from computing system 400 via the I/O port 408 into signals that may be sensed or used by the various methods and system discussed herein. The input device may be an alphanumeric input device, including alphanumeric and other keys for communicating information and/or command selections to the processor 402 via the I/O port 408.

The environment transducer devices convert one form of energy or signal into another for input into or output from the computing system 400 via the I/O port 408. For example, an electrical signal generated within the computing system 400 may be converted to another type of signal, and/or vice-versa. In one implementation, the environment transducer devices sense characteristics or aspects of an environment local to or remote from the computing device 400, such as header pressure or pressure of the high pressure storage 112.

In one implementation, a communication port 410 may be connected to a network by way of which the computer system 400 may receive network data useful in executing the methods and systems set out herein as well as transmitting information and network configuration changes determined thereby. The communication port 410 connects the computer system 400 to one or more communication interface devices configured to transmit and/or receive information between the computing system 400 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 410 to communicate with one or more other machines, either directly over a point-to-point communication path, over a wide area network (WAN) (e.g., the Internet), over a local area network (LAN), over a cellular (e.g., third generation (3G), fourth generation (4G), fifth generation (4G)) network, or over another communication means.

The system set forth in FIG. 4 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

Various embodiments of the disclosure have been discussed in detail. While specific implementations are discussed, it should be understood that this is done for illustration purposes only. A person skilled in the relevant art will recognize that other components and configurations may be used without parting from the spirit and scope of the disclosure. Thus, the description and drawings herein are illustrative and are not to be construed as limiting. Numerous specific details are described to provide a thorough understanding of the disclosure. However, in certain instances, well-known or conventional details have not been described in order to avoid obscuring the description.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Thus, references to one or an embodiment in the present disclosure can be references to the same embodiment or any embodiment; and such references mean at least one of the embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Concentrations, amounts, and other numerical data may be expressed or presented herein in a range format. It is to be understood that such a range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 2 to about 50" should be interpreted to include not only the explicitly recited values of 2 to 50, but also include all individual values and sub-ranges within the indicated range. Thus, included in this numerical range are individual values such as 2, 2.4, 3, 3.7, 4, 5.5, 10, 10.1, 14, 15, 15.98, 20, 20.13, 23, 25.06, 30, 35.1, 38.0, 40, 44, 44.6, 45, 48, and sub-ranges such as from 1-3, from 2-4, from 5-10, from 5-20, from 5-25, from 5-30, from 5-35, from 5-40, from 5-50, from 2-10, from 2-20, from 2-30, from 2-40, from 2-50, etc. This same principle applies to ranges reciting only one numerical value as a minimum or a maximum. Furthermore, such an interpretation should apply regardless of the breadth of the range or the characteristics being described.

As used herein, the terms "a," "an," and "the" are understood to encompass the plural as well as the singular. Thus, the term "a mixture thereof" also relates to "mixtures thereof" and the term "a component" also refers to "components."

As used herein, the term "about" is used to provide flexibility to a numerical range endpoint by providing that a given value may be "a little above" or "a little below" the endpoint. For example, the endpoint may be within 10%, 8%, 5%, 3%, 2%, or 1% of the listed value. Further, for the sake of convenience and brevity, a numerical range of "about 50 mg/mL to about 80 mg/m L" should also be understood to provide support for the range of "50 mg/m L to 80 mg/m L."

In this disclosure, "comprises," "comprising," "containing," and "having" and the like can have the meaning ascribed to them in U.S. Patent Law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. In this specification when using an open ended term, like "comprising" or "including," it is understood that direct support should be afforded also to "consisting essentially of" language as well as "consisting of" language as if stated explicitly and vice versa.

As used herein, the term "load" refers to one or more system or process components or operations that consumes or uses hydrogen. A system of the present disclosure may include one or more loads.

What is claimed is:

1. A system for generating hydrogen, the system comprising:
   at least one hydrogen stack to generate hydrogen;
   a header pressure sensor operable to measure an output pressure of the generated hydrogen from the at least one hydrogen stack; and
   a controller in electrical communication with the at least one hydrogen stack and with the header pressure sensor, the controller:
      receiving a header pressure indicator from the header pressure sensor comprising an indication of the output pressure of the generated hydrogen from the at least one hydrogen stack; and
      controlling, based on the indication of the output pressure of the generated hydrogen from the at least one hydrogen stack, a power supplied to the at least one hydrogen stack to maintain a predetermined header pressure,
      wherein an amount of power supplied to the at least one hydrogen stack is directly proportional to a control factor corresponding to a degradation of hydrogen production over time and based on a predetermined historical rate of hydrogen production generated by the at least one hydrogen stack, the control factor causing the at least one hydrogen stack to produce an amount of hydrogen that maintains the predetermined header pressure.

2. The system of claim 1, wherein the at least one hydrogen stack comprises a hydrogen generator and a power cabinet, the controller in communication with the power cabinet to supply the amount of power to the at least one hydrogen stack.

3. The system of claim 1, wherein the at least one hydrogen stack is an electrolyzer.

4. The system of claim 1, wherein the controller further:
   transmitting a test signal to the at least one hydrogen stack;
   receiving an operational condition of the at least one hydrogen stack based on the test signal; and
   associating the control factor with the at least one hydrogen stack.

5. The system of claim 1 further comprising:
   a process application selected from a group consisting of a reactor, a furnace, and a burner.

6. The system of claim 5, wherein the hydrogen is supplied directly to the process application.

7. The system of claim 5, wherein the hydrogen is supplied to a storage tank located between the at least one hydrogen stack and the process application.

8. The system of claim 1, wherein the at least one hydrogen stack comprises at least two hydrogen stacks connected in parallel.

9. A method for controlling a hydrogen production system, the method comprising:
   controlling, by a controller, a plurality of hydrogen stacks to generate hydrogen, wherein each of the plurality of hydrogen stacks is supplied with a power, the generated hydrogen from the plurality of hydrogen stacks stored in a buffer tank;
   receiving an indication of a combined header pressure from a header pressure sensor;
   determining, based on an operational condition of the plurality of hydrogen stacks, a control factor for each of the plurality of hydrogen stacks, the control factor corresponding to a degradation of hydrogen production over time and based on a predetermined historical rate of hydrogen production generated by a corresponding hydrogen stack of the plurality of hydrogen stacks; and
   adjusting a power to at least one of the plurality of hydrogen stacks based on the combined header pressure and the control factor of the determined at least one of the plurality of hydrogen stacks, the control factor causing the at least one to produce an amount of hydrogen that maintains the predetermined header pressure.

10. The method of claim 9, wherein adjusting the power to the at least one of the plurality of hydrogen stacks comprises communicating, by the controller, with a power cabinet associated with the at least one of the plurality of hydrogen stacks.

11. The method of claim 9, wherein the at least one of the plurality of hydrogen stacks is an electrolyzer.

12. The method of claim 9 wherein the control factor for each of the plurality of hydrogen stacks is associated with an age of a corresponding hydrogen stack.

13. The method of claim 9, further comprising comparing the combined header pressure of the hydrogen to a predetermined header pressure.

14. The method of claim 13, wherein the power is adjusted according to a formula $$W = -C \times (P_{header} - P_{set})$$

wherein W is the adjusted power supplied to the at least one of the plurality of hydrogen stacks, C is the control factor, $P_{header}$ is a combined header pressure value based on the received indication of the combined header pressure, and $P_{set}$ is the predetermined header pressure.

15. A system for controlling hydrogen production, the system comprising:

a plurality of hydrogen stacks, wherein the each of the plurality of hydrogen stacks are supplied with a power to generate hydrogen;

a header pressure sensor operable to measure a combined header pressure of the hydrogen generated from the plurality of hydrogen stacks; and a controller operable to increase or decrease the power supplied to each of the plurality of hydrogen stacks to maintain a predetermined header pressure, wherein the controller is in communication with each of the plurality of hydrogen stacks and with the header pressure sensor, wherein an amount of power supplied to each of the plurality of hydrogen stacks is directly proportional to a control factor corresponding to a degradation of hydrogen production over time and based on an amount of hydrogen generated by each of the plurality of hydrogen stacks, and wherein the amount of power supplied to each of the plurality of hydrogen stacks is determined according to a predetermined historical rate of hydrogen production of a corresponding one of the plurality of hydrogen stacks, the control factor causing the at least one hydrogen stack to produce an amount of hydrogen that maintains the predetermined header pressure.

16. The system of claim 15, wherein each of the plurality of hydrogen stacks comprises a hydrogen generator and a power cabinet.

17. The system of claim 15, wherein at least one of the plurality of hydrogen stacks is an electrolyzer.

18. The system of claim 15, further comprising at least one of a buffer tank, a compressor, and a storage tank.

19. The system of claim 18, wherein each of the plurality of hydrogen stacks supplies hydrogen to the at least one of a buffer tank, a compressor, and a storage tank.

20. The system of claim 15, wherein each of the plurality of hydrogen stacks is connected in parallel.

21. The system of claim 15, wherein the controller determines a control factor for each of the plurality of hydrogen stacks based on the predetermined historical rate of hydrogen production of a corresponding one of the plurality of hydrogen stacks.

22. The system of claim 21 wherein the predetermined historical rate of hydrogen production of a corresponding one of the plurality of hydrogen stacks corresponds to an age of the corresponding one of the plurality of hydrogen stacks.

23. The system of claim 21, wherein the power supplied to each of the plurality of hydrogen stacks is determined by an equation:

$$W = -C \times (P_{header} - P_{set})$$

wherein W is the power supplied to the plurality of hydrogen stacks, C is the control factor, $P_{header}$ is the combined header pressure measured by the header pressure sensor, and $P_{set}$ is a predetermined header pressure.

* * * * *